| United States Patent [19] | [11] | 4,192,723 |
|---|---|---|
| Laude et al. | [45] | Mar. 11, 1980 |

[54] AQUEOUS SOLUTION OF MONOVALENT GOLD AND AMMONIUM SULFITE COMPLEX, PROCESS FOR THE PREPARATION THEREOF AND ELECTROLYTIC BATH OBTAINED THEREFROM FOR THE PLATING OF GOLD OR GOLD ALLOYS

[75] Inventors: Pierre Laude, Prevessin, France; Erwin Marka, Geneva; Franco Zuntini, Morrens, both of Switzerland

[73] Assignee: Systemes de Traitements de Surfaces S.A., Switzerland

[21] Appl. No.: 931,914

[22] Filed: Aug. 8, 1978

[30] Foreign Application Priority Data

Aug. 29, 1977 [CH] Switzerland ............... 10523/77

[51] Int. Cl.$^2$ .................... C01G 7/00; C25D 3/48
[52] U.S. Cl. ........................ 204/43 G; 204/46 G; 423/517; 423/512 A
[58] Field of Search .............. 423/32, 512 A, 517; 204/43 G, 46 G

[56] References Cited

U.S. PATENT DOCUMENTS

| 1,891,532 | 12/1932 | Gibson | 423/32 |
|---|---|---|---|
| 3,057,789 | 2/1965 | Spreter et al. | 204/46 G |
| 3,702,271 | 10/1962 | Smith | 423/518 |
| 3,787,463 | 1/1974 | Zuntini et al. | 204/46 G |

FOREIGN PATENT DOCUMENTS 2723910 12/1977 Fed. Rep. of Germany ........ 204/43 G

Primary Examiner—G. O. Peters
Attorney, Agent, or Firm—Wenderoth, Lind & Ponack

[57] ABSTRACT

Aqueous solution of monovalent gold and ammonium sulfite complex. As opposed to the corresponding alkali-gold sulfite solution, this solution is stable under slightly acidic pH conditions and can be used advantageously for preparing electrolytic baths for the plating of gold and gold alloys having a great flexibility of use and a particularly long working life. This solution is prepared, in a very economical manner, by adding ammonia to an HAuCl$_4$ solution which results in the formation of a precipitate, then by dissolving this precipitate in an aqueous ammonium sulfite solution.

12 Claims, No Drawings

AQUEOUS SOLUTION OF MONOVALENT GOLD AND AMMONIUM SULFITE COMPLEX, PROCESS FOR THE PREPARATION THEREOF AND ELECTROLYTIC BATH OBTAINED THEREFROM FOR THE PLATING OF GOLD OR GOLD ALLOYS

The present invention concerns an aqueous solution of a monovalent gold and ammonium sulfite complex, a process for its preparation and an electrolytic bath for plating gold and its alloys obtained by means of such solution.

Said solution is characterized by the fact that it is stable at a pH slightly acid, even in the absence of stabilizing amines, and that, when it is electrolyzed for the obtaining of gold deposits, it does not practically liberate, over a period of time, any product detrimental to the quality of the latter.

The electrolysis of aqueous solution containing gold in the form of sulfite complexes for obtaining cathodic deposits of this metal is well known. Effectively, it has already been disclosed around 1845 (British Pat. No. 9431). Such solutions, in general, would contain the gold in the form of complexes of gold and of an alkali metal, for instance sodium, and a significant amount of a free alkali sulfite. Sodium gold sulfite can be prepared, for instance, by the reaction of gold chloride ($AuCl_3$) with a strongly alkaline solution of sodium sulfite. According to the following reference: PASCAL, Traite de Chimie Minerale, Masson & Cie (1933), Tome VIII, p. 731, it has the formula $Na_3[Au(SO_3)_2].1.5\ H_2O$. According to the same reference, there exists also an ammonium gold sulfite of formula $(NH_4)_3[Au(SO_3)_2].1.5\ H_2O$ which is obtained by adding dissolved gold chloride to a solution of ammonium sulfite in ammonia. This salt is only slightly soluble in water and will decompose in the presence thereof. Further, still according to the same reference, it is instantaneously destroyed by acids.

Because of their instability at pH below 9, these alkali gold sulfites have been very little used in the past for the electrolytic plating of gold. Moreover, the gold deposits which were obtained therewith had many defects such as lack of gloss, porous aspect, lack of homogeneity, etc. For these various reaons and despite their evident advantages regarding safety of use (the gold sulfite based bath is indeed harmless compared to aurocyanide baths which are very poisonous), the gold sulfite baths were forgotten for about a hundred years.

However, relatively recently, many researchers have reinvestigated the gold sulfite electrolytic baths and have managed to progressively remedy some of their drawbacks.

Thus, U.S. Pat. No. 3,057,789 (Smith) discloses the preparation of a gold sulfite by the precipitation of a gold chloride solution by ammonia and dissolving of the precipitate in sodium or potassium sulfite solutions. For obtaining gold deposits from this solution, it should be first stabilized by the addition of polyamines such as hexamethylenetetramine or of chelatants such as the sodium salt of ethylenediamine tetraacetic acid (EDTA) or a polyphosphate. Such a solution, however, is not stable at slightly acidic pH as noticed by the present Applicants and is not suitable for depositing gold alloys. Thus, at alkaline pH, the ions of certain common alloying metals are not well reduced together with the gold.

Swiss Pat. No. 530,473 (SEL-REX) discloses an improved gold-sulfite bath containing the gold in the form of a sodium sulfite complex, sodium sulfite, chelating agents, alkaline conduction salts, alloying metals such as Cd, Cu, Ni, Zn, Co and Mn and brightening agents. The latter consist of small quantities of arsenic, antimony or selenium compounds and provide a marked improvement in respect of deposit appearance. However, this electrolyte is unstable at pH below 8 and, as already mentioned, is not suitable for plating gold alloys of lower karat.

U.S. Pat. No. 3,475,292 (TECHNIC) is only slightly different from the previous reference. It also concerns an electrolyte for the plating of gold and gold alloys and contains a sodium or potassium gold-sulfite, free sulfites, complexing agents, alloying metals in the form of water-soluble compounds, brighteners based on As, Sb, Se and Te and buffer mixtures. However, as previously, this bath connot be used at pH below 8 because, in this case, gold will precipitate in a colloidal form and settle at the bottom of the plating tank.

Further, the above mentioned baths still have the following drawbacks: During electrolysis, sulfites are oxidized into sulfates (by anodic oxidation or by contact with the air) and the latter tend to crystallize overnight on the bottom of plating tanks. Indeed, the solubility of sodium and potassium sulfates is not considerable at low temperature (about 70–100 g/l at 0° C.). Consequently, conventional gold-sulfite baths must be renewed at relatively close intervals. Moreover, the obligation of using in these baths semi-metal elements such as arsenic for ensuring sufficient brightness in the gold deposits is a strong drawback since, firstly arsenic is very toxic and is no longer allowed by the law of some countries, and secondly when arsenic is added to the bath as a trivalent arsenic compound, the latter progressively oxidizes to pentavalent arsenic which is useless and even harmful as it pollutes the bath. Since the effective quantity of $As^{3+}$ is relatively small (about 10–500 mg/l) it is difficult (in view of the permanent $As^{3+} \rightarrow As^{5+}$ oxidation) to maintain this effective concentration within acceptable limits and, consequently, this concentration must be ascertained at very close intervals and readjusted accordingly by frequent trivalent arsenic replenishments.

To remedy these drawbacks, there was disclosed (U.S. Pat. No. 3,787,463; Oxy Metal Finishing) a trivalent gold-sulfite complex with organic amines and its use for preparing gold sulfite baths which are stable in slightly acidic media. This complex is represented by the formula $ME[AAu(SO_3)_2]_pX_q$ wehrein ME is a cation, preferably alkaline, A is a polyamine, preferably ethylene diamine (en), X is an anion, e.g., $Cl^-$ and $p+q$ is a number equal to the valency of ME, p being generally 1 (alkali metals) with $q=0$.

These complexes are prepared by adding polyamine A to a solution of a trivalent gold compound, e.g., $AuCl_3$, then by adding an alkali or ammonium sulfite which results in the precipitation of the desired complex. For preparing a gold sulfite bath from this complex, the latter must be reduced in monovalent gold with a reducing agent, usually an excess of alkali sulfite or $SO_2$. The nature and the structure of the monovalent gold complex which thus forms are unknown but it has been confirmed that such solutions are stable under slightly acidic conditions and, consequently, they are capable of more easily codepositing common metals with the gold, which makes it possible to favorably obtain lower karat gold-alloys deposits. Similarly, Swiss Pat. No. 534,215 discloses an alkali-sulfite gold bath (sodium or potassium) for the electrolytic deposition of gold-palladium alloys in which there is added, for stabilization at pH slightly below 7, aliphatic, cycloaliphatic and heterocyclic amines.

However, gold baths prepared in the above described manner have the following disadvantages: during electrolysis of the bath, the stabilizing amines which enable the latter to operate at pH below 7 are progressively liberated as gold is removed for plating from the complex and as the bath is replenished with gold and stabilizers. Further, these amines are oxidized and decomposed at the anode and, either themselves, or their degradation products impede the operation of the bath, for example by complexing and blocking the common metals which must co-deposit with the gold in the plated alloy and, thus, decreasing the useful concentration thereof at the cathode. Consequently, these baths have a very short working life and must be frequently renewed.

It should be moreover remarked that in U.S. Pat. No. 3,787,463, it is mentioned that polyamine A can also consist of ammonia. However, the present Applicants have not succeeded in preparing such a compound of $Au^{3+}$ wherein A represents $NH_3$ and, simultaneously, ME represents $NH_4^+$. Thus, in contrast to what happens with amines, when ammonium hydroxide is added to a solution of trivalent gold chloride, the mixture precipitates before the introduction of the sulfite. This precipitate, the nature of which is ill-determined, is called "fulminating gold" in the chemical literature (see the heretofore mentioned reference: PASCAL, p. 783). It is interesting to note that the method of the invention is precisely based on this precipitation phenomenon and provides an ammonium-gold-sulfite complex solution which permits, by means of the gold bath prepared therefrom, one to remedy most of the above mentioned disadvantages.

Thus, the method of the invention for the preparation of an aqueous solution of a sulfite complex of monovalent gold and ammonium comprises treating an aurihydrochloric acid ($HAuCl_4$) aqueous solution with ammonia which provides a precipitate of a gold compound, then decanting the supernatant solution and washing the precipitate, by decantation, until practically all chloride ions are eliminated, then adding to the moist precipitate a sufficient quantity of an ammonium sulfite solution for dissolving the precipitate and ensuring the reduction of trivalent gold in monovalent gold.

The complete reduction of trivalent gold into monovalent gold can be easily checked by electrolyzing a sample of the above-mentioned solution. When a yield approaching 100% (120 mg/Amp×min) is reached, the reduction is complete. Thus, at least 3.5 equivalent of sulfite (3.5 moles) of ammonium sulfite per mole of precipitated gold (calculated on the number of moles of starting $HAuCl_4$) will preferably be used.

This process of preparation of a solution of gold-sulfite complex is particularly economical as compared to older processes. Thus, the precipitation of gold with ammonia is substantially quantitative and the precipitate is easily washable by simple decantation as its particles will settle relatively rapidly at the bottom of the container used. The exact nature of this precipitate has not been investigated. Presumably, it is similar to the "fulminating" gold compounds reported by DUMAS, RASCHIG and other workers (see PASCAL, op. cit.), maybe in admixture with hydroxide $Au(OH_3)$. The specific chemical formula and the exact nature of the gold-sulfite complex which is obtainable in solution by the present method has never been determined. It is however, probable that it is not similar to the products mentioned in the prior-art (see PASCAL, op. cit. p. 732) since its solution is perfectly stable in water even at slightly acid pH, in contrast to the reports on the ammonium gold-sulfite of formula $(H_4N)_3[Au(SO_3)_2].1\ H_2O$. This stability property was indeed absolutely unexpected and constitutes a surprising factor of the present invention.

The operating conditions of the present method are not critical. It is possible to work at room temperature and use, for instance, a concentrated $HAuCl_4$ solution (about 80-100 g/l of gold) to which concentrated aqueous ammonia (about 30%) is added slowly. Practice has however shown that it is advantageous to use a very concentrated $HAuCl_4$ solution (more than 500 g/l) with very little free HCl. After adding an excess of ammonia until the precipitation is complete, the precipitate is allowed to settle for decantation. Then the supernatant liquid is removed by syphoning and replaced by pure water. The precipitate is agitated, decantation is carried out again and this washing step is repeated 2 or 3 times until practically all chloride has been eliminated. Washing by filtration should preferably be avoided for fear of drying up of the precipitate (explosion hazard). Then, after eliminating finally, as well as possible, the rinsing waters, an aqueous solution of ammonium sulfite (commercial grade is suitable) is added for dissolving the precipitate. The quantity and concentration of the sulfite solution is calculated to ensure that the finished ammonium-gold-sulfite solution will contain about 100 g/l of gold for about 160-210 g/l of total ammonium sulfite. These values are, in fact, not at all critical but it is preferable to keep as close as possible thereto for convenience when using, thereafter, the obtained ammonium-gold-sulfite solution for preparing or maintaining gold plating baths.

The aqueous electrolytic bath containing the present ammonium-gold-sulfite complex which is prepared from the above discussed solution is stable and is operated within the 6-8 pH range. It comprises 1 to 50 g/l of gold metal, 10-400 g/l of ammonium sulfite, 10 to 400 g/l of buffering and conducting salts and it may or not further comprise alloying metals in the form of water-soluble compounds or complexes.

Thus, this bath which contains the gold in the form of an ammonium-gold-sulfite complex is able to provide electrodeposits in acidic media as well as alloyed gold and pure gold, and without needing depolarizers such as arsenic or selenium, even at current densities of 0.25 to 0.5 A/dm², or stabilizers such as polyamines, which was practically impossible with alkali-gold-sulfite baths of the prior art. Under such conditions, it is possible with the present bath to obtain bright and semi-bright 24 karat deposits, homogeneous and non-porous. Further, because of the absence of arsenic, this bath is acceptable in the countries in which the use of this element in industry is restricted or prohibited by law.

Moreover, this bath being adaptable to acid pH, it is perfectly suited to the deposition of lower karat gold alloys, e.g., 15 to 18 karat. As alloying metals for instance Cd, Pd, Cu, Zn, Sb, In, Ni, Co, Fe, Pb, Bi, Ru, etc., can be mentioned with no limitation. The conentration of those metals in the bath can be e.g. 0.01-150 g/l. These metals are present in the bath as their salts or complexes conventionally used in gold baths, e.g., the sulfates, nitrites, sulfamates, phosphates, pyrophosphates, acetates, citrates, phosphonates, carbonates, etc. Since the bath is not loaded and does not contain any amine which, as mentioned heretofore, might degrade and/or block with time part of the dissolved alloying metals, it has a considerable operating stability and does not have to be frequently controlled and adjusted for preventing undesirable variations of karat, appearance and other characteristics of the deposited alloys, as is the rule with gold-sulfite baths of the prior art, namely the sodium and potassium alkaline gold-sulfite baths.

Furthermore, the present bath has the following additional advantage, as mentioned hereinabove, the anodic oxidation of sulfites gives the corresponding sulfates and, in the case of the sodium or potassium based baths, the latter crystallize with time at the bottom of the tank. In contrast, ammonium sulfate is 2 to 3 times more soluble than $Na_2SO_4$ and $K_2SO_4$ between 0° and 20° C.; therefore this crystallization drawback is considerably minimized in the case of the present bath which is a significant advantage because of a marked extension of the electrolyte working life.

Among the water-soluble conducting salts which may be comprised in the present bath, the following can be recited as examples: phosphates, phosphonates, sulfates, sulfonates, acetates, tartrates, citrates, gluconates, phthalates, nitrites, carbonates of alkali or earth-alkali metals but, preferably, of ammonium.

The present bath may still contain, if desired, small quantities of metals, semi-metals or metalloids for modifying the properties of the gold or gold-alloys deposits, e.g., color, hardness, internal stress, grain texture (crystallization mode), brightness, etc. Among such substances, the following can be mentioned: selenium, tellurium, thallium, lead, antimony which may or may not co-deposit with the gold or the gold alloys. The concentration of such substances, incorporated in the bath as their usual water-soluble compounds, can be in the range of 1 mg/l to 10 g/l.

The present bath may further contain complexing and chelating additives for controlling the relative proportions of common or precious metals available at the cathode for co-deposition with the gold. These additives may comprise amino-carboxylic acids such as ethylenediamine-tetraacetic acid (EDTA), diethylene-triamine-pentaacetic acid, nitrilotriacetic acid, etc., ethylenediamine-polymethanephosphonic acids and their salts of alkali-metals, preferably of ammonium; citrates, lactates, malonates, oxalates, gluconates, etc. of alkali-metals, but preferably of ammonium. These agents can be added to the present bath also for complexing and blocking possible metal impurities which may accidentally fall into the solution. The concentrations of such chelating or complexing agents may be comprised between 1 and 200 g/l.

It was further discovered that the operating conditions and the behavior of the present bath could still be improved, and especially under high current density conditions, by incorporating therein an oxidizing compound inert toward the sulfites of the bath but capable of oxidizing, at least partly, the sulfur compounds which may possibly form at the cathode by the reduction of the sulfites. It is indeed thought that, under high current density operation, part of the current may cathodically reduce the sulfites to lower valency sulfur compounds such as, for instance, pyrosulfites, dithionites, dithionates, and tetrathionates. It is believed that the existence of such reducing agents in possible excess at the cathode is detrimental since, in such case, the reduction of the gold may locally be so fast that the latter will deposit unevenly which may harm the aspect of the platings. This situation could also lead to the unforeseen production of colloidal gold. Thus, having present an oxidizing compound, the oxidation-reduction potential of which is not enough for oxidizing the sulfites to sulfates, but, nevertheless, sufficient to destroy the divalent sulfur compounds is certainly desirable, especially when it is desired to operate under current densities higher than 0.5 $A/dm^2$.

Among such oxidizing compounds, there are, for example, p-nitrophenol, 2,4-dinitrophenol, 2,6-dinitrophenol and 2,4,6-trinitrophenol. For having a noticeable effect, these compounds can be added to the present bath at concentrations of about 5 mg/l or more, e.g., up to the solubility limit of the considered product in the bath solution. Other compounds having oxidation-reduction potentials in the same range as the above nitro-phenols can also be used.

It will be mentioned finally that, in the present invention, the ammonium ion ($NH_4^+$ in the usual sense) can also comprise the tetramethylammonium ion.

The following non-limitative Examples illustrate the invention in a more detailed manner.

EXAMPLE 1

Bath for the Electrodeposition of Pure Gold (Bath A)

The following ingredients were mixed with water at the indicated concentration:

| INGREDIENTS | CONCENTRATIONS |
|---|---|
| Au (in the form of a concentrated solution of the ammonium and gold sulfite complex, e.g., 100 ml of a 100 g/l solution) | 10 g/l |
| $(NH_4)_2SO_3$ (free) | 80 g/l |
| $(NH_4)_2SO_4$ | 30 g/l |

The pH was adjusted to 6.8 (with $NH_4OH$ or $H_2SO_4$ if necessary) and the bath was subjected to electrolysis at 56° C. under 0.25 $A/dm^2$. There were obtained 24 karat, bright, ductile and non-porous deposits. The plating yield was 120 mg/A·min that is about 100%. A plating thickness without cracks up to 200μ could be attained.

When the current density was raised to 0.5 $A/dm^2$, the deposits lost some of their gloss and became semi-bright. Then, there was added to the bath 1 g/l of 2,4,6-trinitrophenol which entirely restored the original brightness of the platings. The plating yield was decreased only down to 115 mg/A·min which decrease is negligible.

As a comparison, a control bath B was prepared by using the corresponding sodium compounds, the gold solution being replaced by commercial sodium-gold-sulfite. The concentration (Au:10g/l, $Na_2SO_3$:80 g/l and $Na_2SO_4$:30 g/l) were identical to the concentrations in A of the present Example. The pH was adjusted to 6.8 with diluted $H_2SO_4$ and the electrolysis was carried out at 56° C. and under 0.25 $A/dm^2$. It was noticed that gold would plate with only very low yields (13–14 mg/A·min) and the bath became rapidly unstable, which resulted in some gold precipitation near the cathode. In order to correctly operate with control bath B, it was necessary to raise the pH to 8.5–9 and to add 50 mg/l of $As_2O_3$. The addition of 2,4,6-trinitrophenol to bath B had no beneficial effect.

In order to ascertain the behavior of bath A containing the trinitrophenol under basic conditions, the pH was raised to 9.5 with $NH_4OH$ and the bath was operated at 56° C. under 0.5 $A/dm^2$. In such conditions the platings became black and useless. Then, the addition of 20–50 mg/l of $As_2O_3$ restored the quality of the deposits.

EXAMPLE 2

Pink Gold Bath

The following compounds were dissolved and mixed:

| INGREDIENTS | CONCENTRATIONS |
| --- | --- |
| Au (same solution as in Example 1) | 8 g/l |
| $(NH_4)_2SO_3$ (total dissolved) | 100 g/l |
| $CuSO_4 \cdot 5H_2O$ | 400 g/l |
| $(NH_4)_2SO_4$ | 20 g/l |
| 2,4,6-trinitrophenol | 0.5 g/l |

Diluted $H_2SO_4$ was added to bring the pH to 7–7.2. The bath was electrolyzed under 0.5 $A/dm^2$ and 48° C. and gave bright, 23 karat, light-pink gold alloy deposits, even at thickness exceeding 20μ. Yield 85–90 mg/A·min.

EXAMPLE 3

White Gold Bath

The following ingredients were mixed:

| INGREDIENTS | CONCENTRATIONS |
| --- | --- |
| Au (in the form of the same solution as in Example 1) | 8 g/l |
| $(NH_4)_2SO_3$ (total dissolved) | 100 g/l |
| $(NH_4)SO_4$ | 20 g/l |
| Pd (as thediamminodinitrite) | 5 g/l |
| In (as the sulfate · | 0.2 g/l |
| 2,4,6-trinitrophenol | 1 g/l |

At pH 7.2, 50° C. and 0.5 $A/dm^2$, this bath gave bright white-gold deposits of 22.5 karat and with a yield of 55–60 mg/A·min.

EXAMPLE 4

Bath for Hard Gold Plating

| INGREDIENTS | CONCENTRATIONS |
| --- | --- |
| Au (same solution as in Example 1) | 10 g/l |
| $(NH_4)_2SO_3$ | 100 g/l |
| $(NH_4)_2SO_4$ | 50 g/l |
| Ni (as nickel imino-triacetate) | 0.2 g/l |
| 2,4-dinitrophenol | 1 g/l |

This bath was operated at pH 7.2, 55° C. and 0.4 $A/dm^2$ and gave 23.8 karat, bright deposits, of hardness 110–135 kg/mm²HV. Yield about 110 mg/A·min.

EXAMPLE 5

18 Karat Gold-Copper Bath

The following ingredients were dissolved and mixed:

| INGREDIENTS | CONCENTRATIONS |
| --- | --- |
| Au (as the ammonium-gold-sulfite complex) | 10 g/l |
| $NH_4$-ethylenediamine-tetramethephosphonate | 50 g/l |
| $(NH_4)_2SO_3$ | 100g/l |
| Cu (as the sulfate) | 1.8 g/l |

When this bath was operated at pH 7, 55° C. under 0.6 $A/dm^2$, hard, ductile, about 18 karat red-gold deposits were obtained with a yield of 52–55 mg/A·min.

EXAMPLE 6

Comparison between the Useful Working Life of the Bath of the Invention and That of the Gold-Sulfite Baths of the Prior Art An extended comparative electrolysis was performed of the bath A disclosed in Example 1 and of a bath of the prior art: Example 2 of U.S. Pat. No. 3,475,292. With the latter, crystallization and precipitation of solids, namely sodium sulfate, occurred in the tank before plating a total of 200 g of gold metal per liter of the bath were achieved. In the case of bath A, it was possible to plate more than 500 g of gold per liter of the bath with no observable crystallization nor precipitation of solids.

What is claimed is:

1. An aqueous solution of a monovalent gold and ammonium sulfite complex, which is stable under slightly acidic conditions.

2. The solution of claim 1, which comprises solids resulting from the precipitation of trivalent gold salts solution with ammonia, said solids being dissolved in at least 3.5 equivalents of ammonium sulfite in aqueous solution so as to provide a gold concentration within said solution of about 10 to 200 g/l.

3. A process for the preparation of an aqueous solution of a monovalent gold and ammonium sulfite complex which is stable under slightly acidic conditions which comprises:

treating a concentrated hydroaurichloric acid ($HAuCl_4$) solution with ammonia to thereby form a precipitate of a gold compound;

then decanting the supernatant solution;

washing by decantation said precipitate with water until nearly complete elimination of the chlorides;

then adding to the precipitate a quantity of aqueous solution of ammonium sulfite sufficient to dissolve it and ensure the reduction of the trivalent gold to monovalent gold.

4. The process of claim 3, which comprises using a $HAuCl_4$ solution containing at least 100 g/l of gold, ammonia with a concentration of at least 20% and, for effecting the dissolution of the precipitate using a minimum of 3.1 equivalents of $(NH_4)_2SO_3$ at about 30% in $H_2O$.

5. The process of claim 4 wherein the bath further comprises an oxidizing agent inert toward sulfites of the bath, but capable of oxidizing all or part of the divalent sulfur compounds of the bath, which sulfur compounds form by the cathodic reduction of the sulfite, so as to improve the behavior of the bath in electrolytic deposition of gold at high current density and the physical properties of the electrodeposits therefrom.

6. The process of claim 5, wherein said oxidizing agent is a nitrophenol.

7. The process of claim 6, wherein said nitrophenol is 2,4,6-trinitrophenol.

8. Aqueous electrolytic bath comprising the solution of claim 1, for plating gold or gold alloys on conductive pieces or pieces made conductive of electricity, which comprises 1–50 g/l of gold in the form of the ammonium-gold-sulfite complex, 10–400 g/l of $(NH_4)_2SO_3$, 10–400 g/l of conducting salts, buffering salts or both, and which is stable and is operative for said plating at pH 6–8 without stabilizing amines and without brightening agents based on arsenic.

9. The bath of claim 8, wherein the pH is adjusted by adding an acid or a base.

10. The bath of claim 9, wherein said acid or base is $H_2SO_4$ or $NH_4OH$, respectively.

11. The bath of claim 8, which further comprises alloying metals as their water-soluble compounds or complexes.

12. The bath of claim 11, wherein said metals are selected from the group consisting of Cd, Pd, Cu, Zn, Sb, In, Ni, Co, Fe, Pb, Bi and Ru the concentration of which in the bath is about 0.01–150 g/l.

* * * * *